(No Model.)

M. LITTLETON.
CAKE OR PIE PAN.

No. 386,077. Patented July 10, 1888.

Witnesses:
Wm. Babbitt.
Thos. J. Moore.

Inventor.
M. M. Littleton.

UNITED STATES PATENT OFFICE.

MARIA LITTLETON, OF SANDUSKY, OHIO.

CAKE OR PIE PAN.

SPECIFICATION forming part of Letters Patent No. 386,077, dated July 10, 1888.

Application filed November 2, 1887. Serial No. 254,123. (No model.)

*To all whom it may concern:*

Be it known that I, MARIA LITTLETON, of the city of Sandusky, county of Erie, and State of Ohio, have invented a new and useful Improvement in Cake or Pie Pans, of which the following is a specification.

The object of my invention is to provide a convenient and useful device for removing cakes and pies from the pans in which they are baked without breaking or spoiling them.

The sides of the pan and bottom rim consist of one piece of metal pressed to the desired shape—that is, so pressed as to make a perfect pan when the false or removable bottom is in position. The bottom rim, on which the false or removable bottom rests, is from one-half inch to one inch wide. The false or removable bottom is made to exactly fit the inside of the pan, and rests on the bottom rim, as aforesaid. When the false or removable bottom is in position, it is fastened by two "projections" and one "spring-arm." The projections are produced by making a dent on the outside of the side or collar of the pan, leaving just space enough between the inward projections thus made and the bottom rim or flange to insert the false or removable bottom. The projections are made from four to five inches apart, (more or less,) according to the size and form of the pan. The spring-arm is made of wire and soldered or riveted to the outside of the pan at a point nearly opposite a point half-way between said projections. A hole the size of the wire used in the spring is punched in the side or collar of the pan at a point directly opposite a point half-way between said projections, leaving just space enough between it and the bottom rim or flange for the false or removable bottom. One end of the spring-arm is bent to form a pin, which is inserted in the hole aforesaid, and when so inserted holds the false or removable bottom in position.

The mode of operation is as follows: To place the false or removable bottom in position, insert it between the inward projections and the bottom rim or flange and let it fall to place; then pass the loose end of the spring-arm into the hole aforesaid. To remove the false or removable bottom, withdraw the loose end of the spring arm from the hole in the side or collar of the pan and pass it to the bottom of the pan and lift on center of false or removable bottom from underneath.

The accompanying drawings show different parts of the invention described in this specification.

Similar letters of reference indicate like parts.

Figure 1:
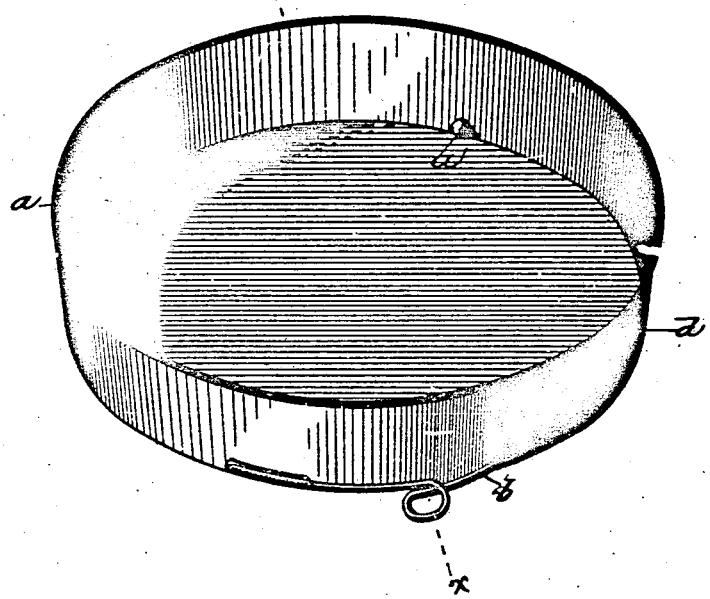
Figure 2:
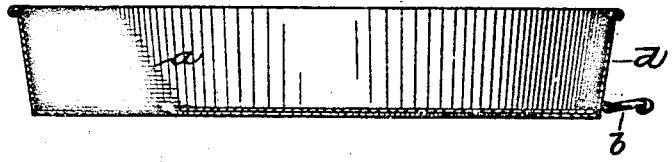

Figure 1 is a perspective view of pan ready for use. Fig. 2 is a perspective view of one-half of pan.

Parts marked with letter $a$ are the inward projections.

Part marked with letter $b$ is spring arm.

Part marked with letter $c$ is false or removable bottom.

Part marked with letter $d$ is side or collar of the pan.

In using this pie and cake pan much time is saved in removing the pie or cake without breaking, thereby avoiding the trouble experienced in using the ordinary pan without removable bottom.

I claim as my invention—

A bake-pan consisting of a side having an inwardly-projecting flange, inward projections, and an opening above said flange, and a spring-arm whose loose end passes through said opening, in combination with a removable bottom.

MARIA LITTLETON.

Witnesses:
CHAS. M. PAUL,
CHAS. G. NIELSEN.